(12) United States Patent
Ushida

(10) Patent No.: US 9,100,596 B2
(45) Date of Patent: Aug. 4, 2015

(54) COMMUNICATION DEVICE, AND METHOD AND COMPUTER READABLE MEDIUM FOR THE SAME

(75) Inventor: Takehito Ushida, Toyokawa (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 685 days.

(21) Appl. No.: 13/363,019

(22) Filed: Jan. 31, 2012

(65) Prior Publication Data

US 2012/0254072 A1  Oct. 4, 2012

(30) Foreign Application Priority Data

Mar. 31, 2011 (JP) .................. 2011-078094

(51) Int. Cl.
| | |
|---|---|
| G06Q 10/00 | (2012.01) |
| G06Q 30/00 | (2012.01) |
| H04N 1/34 | (2006.01) |
| H04M 15/00 | (2006.01) |
| G06F 17/00 | (2006.01) |
| G06G 7/00 | (2006.01) |
| H04N 1/00 | (2006.01) |

(52) U.S. Cl.
CPC ................. *H04N 1/34* (2013.01); *H04M 15/80* (2013.01); *H04M 15/8044* (2013.01); *H04M 15/8055* (2013.01); *H04M 15/8061* (2013.01); *H04N 1/00217* (2013.01); *H04N 2201/0094* (2013.01); *H04N 2201/3335* (2013.01)

(58) Field of Classification Search
CPC .... G06Q 30/0283; G06Q 10/06; H04L 45/00; H04L 67/32
USPC ......... 705/1.1, 7.11–7.42, 400, 418; 709/240, 709/241
See application file for complete search history.

(56) References Cited

U.S. PATENT DOCUMENTS 6,502,139 B1 * 12/2002 Birk et al. ...................... 709/233
6,947,388 B1 * 9/2005 Wagner ......................... 370/252

FOREIGN PATENT DOCUMENTS

| JP | S64-037165 A | 2/1989 |
|---|---|---|
| JP | 2002-158698 A | 5/2002 |
| JP | 2012-100131 A | 5/2012 |
| JP | 2012-175152 A | 9/2012 |

OTHER PUBLICATIONS

Japan Patent Office, Notification of Reasons for Rejection for Japanese Patent Application No. 2011-078094 (counterpart to above-captioned patent application), mailed May 14, 2013.

* cited by examiner

*Primary Examiner* — George Chen
(74) *Attorney, Agent, or Firm* — Merchant & Gould PC

(57) ABSTRACT

A communication device is provided, which includes a controller configured to select a first bandwidth, calculates a first communication time for transmitting data using the first bandwidth, to sum one or more periods of a first charging unit time for the first bandwidth to calculate a second communication time that is equal to or longer than the first communication time and closest to the first communication time, to calculate a data amount of a terminal data section to be transmitted within a last period of the first charging unit time, and to select a second bandwidth for transmitting the terminal data section at a lowest communication fee within a second charging unit time for the second bandwidth, the controller controlling a communication unit to transmit data other than the terminal data section using the first bandwidth and transmit the terminal data section using the second bandwidth.

15 Claims, 11 Drawing Sheets

FIG.10

| BANDWIDTH | TRANSMISSION SPEED(per second) | CHARGING TIME(seconds) | CHARGE (Yen) |
|---|---|---|---|
| 2.6 Mbps~ | 5.0 MB | 180 | 105 |
| 1 Mbps~2.6 Mbps | 332 KB | 180 | 15 |
| 512 kbps~1 Mbps | 128 KB | 30 | 2 |
| 64 kbps~512 Kbps | 64 KB | 30 | 1.5 |
| 0 kbps~64 kbps | 8 KB | 30 | 1 |

FIG.11

FAX DATA AMOUNT = 1805 MB
BANDWIDTH = 2.6 Mbps~
TRANSMISSION SPEED = 5.0 MB/s (MAXIMUM TRANSMISSION ABILITY OF MULTI-FUNCTION PERIPHERAL 10)

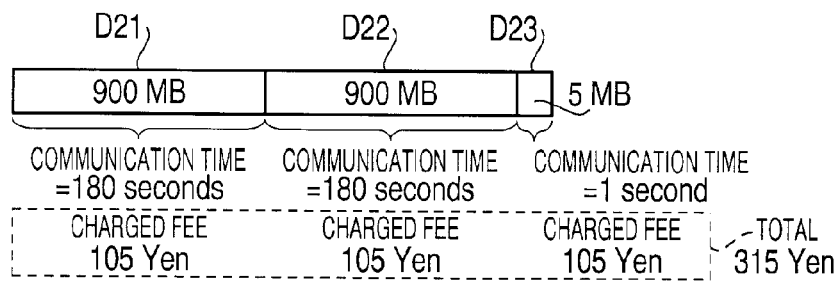

FIG.12

FAX DATA AMOUNT = 1805 MB
BANDWIDTH = 2.6 Mbps~
TRANSMISSION SPEED = 5.0 MB/s (MAXIMUM TRANSMISSION ABILITY OF MULTI-FUNCTION PERIPHERAL 10)

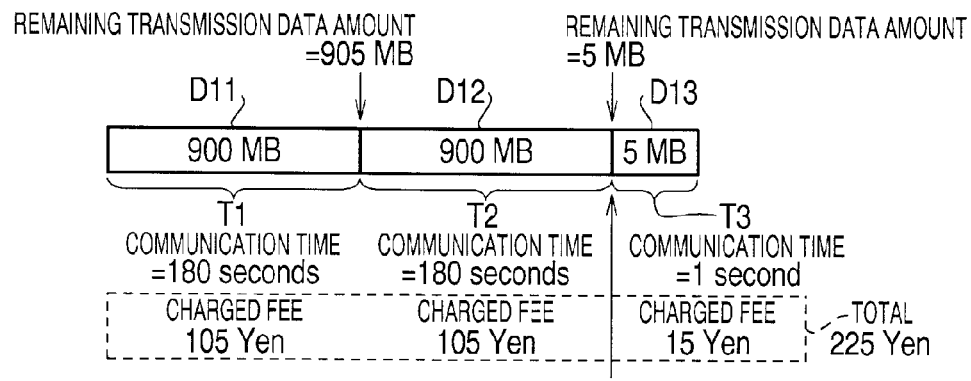

```
v=0
o=-2890844526 2890842807 IN IP4 128.59.19.68
s=-
c=IN IP4 128.59.19.68
t=0 0
m=application 9 TCP t38
b=AS:512          ← A1
a=T38FaxVersion:1
a=T38FaxRateManagement:localTCP
a=setup:active
a=connection:new
```

FIG. 13

```
v=0
o=-345678 456789 IN IP4 192.168.1.10
s=-
c=IN IP4 192.168.1.10
t=0 0
m=application 49152 TCP t38
b=AS:1000
a=T38FaxVersion:1
a=T38FaxRateManagement:localTCP
a=fmtp:t38 DIS=ffc80120EEB8C48091808098000  ~A2
a=setup:passive
a=connection:new
```

FIG. 15

COMMUNICATION DEVICE, AND METHOD AND COMPUTER READABLE MEDIUM FOR THE SAME

CROSS-REFERENCE TO RELATED APPLICATION

This application claims priority under 35 U.S.C. §119 from Japanese Patent Application No. 2011-078094 filed on Mar. 31, 2011. The entire subject matter of the application is incorporated herein by reference.

BACKGROUND

1. Technical Field

The following description relates to one or more techniques for performing data communication using one of a plurality of bandwidths.

2. Related Art

A bandwidth-guaranteed data communication service is a service for performing various kinds of communication (such as facsimile transmission/reception) via a network using a SIP (Session Initiation Protocol) server or a SIP adaptor. A connection with a bandwidth-guaranteed network can be established by selecting a bandwidth (e.g., 1 Mbps (megabit per second), 64 kbps (kilobit per second), etc.) to be used for each line connection. Further, the bandwidth used for communication can be changed during the communication.

SUMMARY

In the bandwidth-guaranteed data communication service, there are cases where a charging system (a time-based charging system) is applied to charge a terminal device a communication fee depending on a time taken for data communication. In these cases, each time a predetermined time (e.g., three minutes) has elapsed, a communication fee is additionally charged for another predetermined time of data communication. In addition, the broader the used bandwidth is (i.e., the higher the communication speed is), the higher the communication fee for each predetermined time is.

When a transmission time required for sending all data exceeds the predetermined time, a further predetermined time of data communication is additionally counted one or more times. In this case, the data amount of a terminal data section that is data transmitted during the last predetermined time is equal to or less than a data amount transmittable during the predetermined time. Further, the broader the used bandwidth is, the larger the data amount transmittable during the predetermined time is. Hence, when the data amount of the terminal data section is smaller than the data amount transmittable during the predetermined time, the terminal data section is regarded as having been transmitted using a bandwidth broader than necessary. Since a higher communication fee is charged for a predetermined time of communication using a broader bandwidth, the communication fee charged for transmission of the terminal data section is higher than necessary.

Aspects of the present invention are advantageous to provide one or more improved techniques for performing data communication using one of a plurality of bandwidths which techniques make it possible to resolve the aforementioned problem.

According to aspects of the present invention, a communication device is provided, which includes a communication unit configured to be connected with a bandwidth-guaranteed network and transmit data using one of a plurality of bandwidths that provide respective different communication speeds and respective different communication fees per charging unit time, and a controller configured to control the communication device and provide a first selecting unit configured to select a first bandwidth from the plurality of bandwidths, a first calculating unit configured to calculate a first communication time required for completely transmitting the data using the first bandwidth, a second calculating unit configured to sum one or more periods of a first charging unit time for the first bandwidth to calculate a second communication time of a length that is equal to or longer than the first communication time and closest to the first communication time and to calculate a data amount of a terminal data section to be transmitted within a last period of the first charging unit time included in the second communication time, and a second selecting unit configured to select, from the plurality of bandwidths, a second bandwidth that allows complete transmission of the terminal data section at a lowest communication fee within a second charging unit time for the second bandwidth, based on the calculated data amount of the terminal data section. The controller controls the communication unit to transmit a data section of the data other than the terminal data section using the first bandwidth and transmit the terminal data section using the second bandwidth.

According to aspects of the present invention, further provided is a method adapted to be implemented on a processor coupled with a communication unit configured to be connected with a bandwidth-guaranteed network and transmit data using one of a plurality of bandwidths that provide respective different communication speeds and respective different communication fees per charging unit time, the method including a first selecting step of selecting a first bandwidth from the plurality of bandwidths, a first calculating step of calculating a first communication time required for completely transmitting the data using the first bandwidth, a second calculating step of summing one or more periods of a first charging unit time for the first bandwidth to calculate a second communication time of a length that is equal to or longer than the first communication time and closest to the first communication time and calculating a data amount of a terminal data section to be transmitted within a last period of the first charging unit time included in the second communication time, a second selecting step of selecting, from the plurality of bandwidths, a second bandwidth that allows complete transmission of the terminal data section at a lowest communication fee within a second charging unit time for the second bandwidth, based on the calculated data amount of the terminal data section, and a transmission control step of controlling the communication unit to transmit a data section of the data other than the terminal data section using the first bandwidth and transmit the terminal data section using the second bandwidth.

According to aspects of the present invention, further provided is a non-transitory computer readable medium storing instructions that, when executed by a processor coupled with a communication unit configured to be connected with a bandwidth-guaranteed network and transmit data using one of a plurality of bandwidths that provide respective different communication speeds and respective different communication fees per charging unit time, cause the processor to perform a first selecting step of selecting a first bandwidth from the plurality of bandwidths, a first calculating step of calculating a first communication time required for completely transmitting the data using the first bandwidth, a second calculating step of summing one or more periods of a first charging unit time for the first bandwidth to calculate a second communication time of a length that is equal to or longer than the first communication time and closest to the first communication time and calculating a data amount of a terminal data section to be transmitted within a last period of the first charging unit time included in the second communication time, a second selecting step of selecting, from the plurality of bandwidths, a second bandwidth that allows complete transmission of the terminal data section at a lowest communication fee within a second charging unit time for the second bandwidth, based on the calculated data amount of the terminal data section, and a transmission control step of controlling the communication unit to transmit a data section of the data other than the terminal data section using the first bandwidth and transmit the terminal data section using the second bandwidth.

BRIEF DESCRIPTION OF THE ACCOMPANYING DRAWINGS

FIG. 1 exemplifies a configuration of a communication system in an embodiment according to one or more aspects of the present invention.

FIG. 10 exemplifies a bandwidth charging information table in the embodiment according to one or more aspects of the present invention.

FIG. 11 is an illustrative drawing that shows a communication fee to be charged in a comparative example.

FIG. 12 is an illustrative drawing that shows a communication fee to be charged in the embodiment according to one or more aspects of the present invention.

FIG. 13 exemplifies an SDP (Session Description Protocol) of an INVITE message in the embodiment according to one or more aspects of the present invention.

Figure 14:
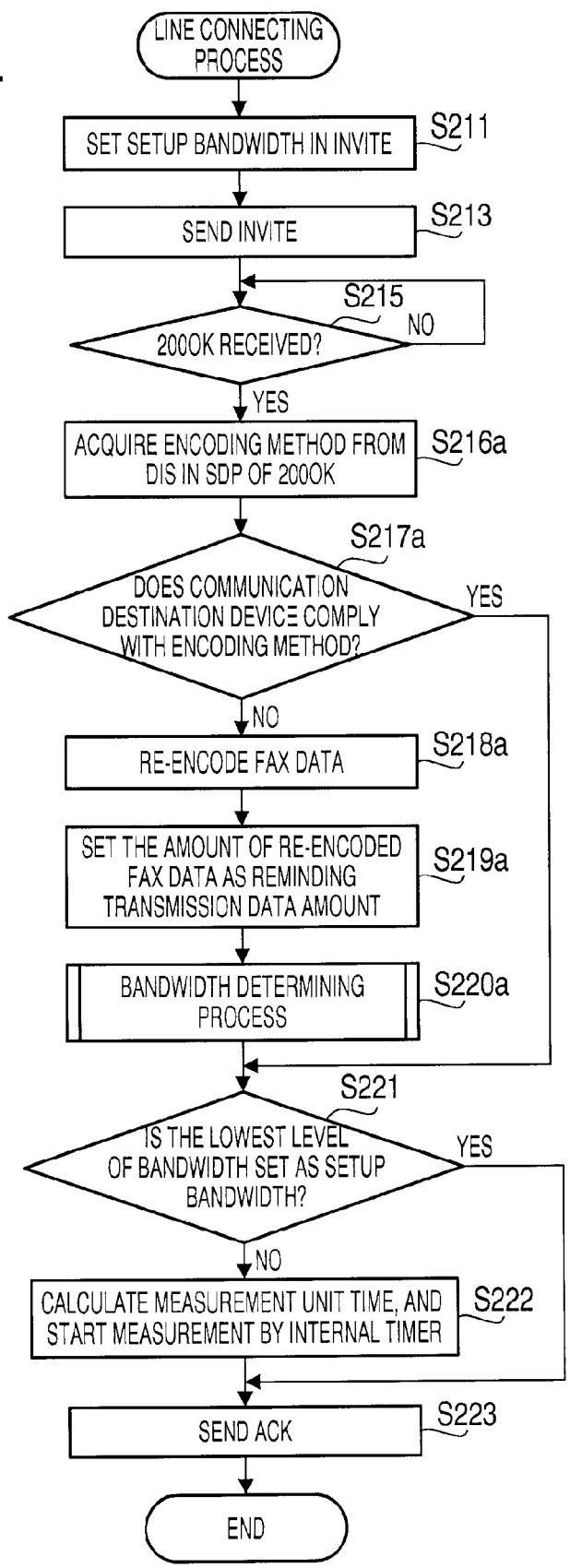

FIG. 14 is a flowchart showing a procedure of a line connecting process in a modification according to one or more aspects of the present invention.

FIG. 15 exemplifies an SDP of a 200OK message in the modification according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an embodiment according to aspects of the present invention will be described with reference to the accompanying drawings.

(Configuration of System)

Figure 1:
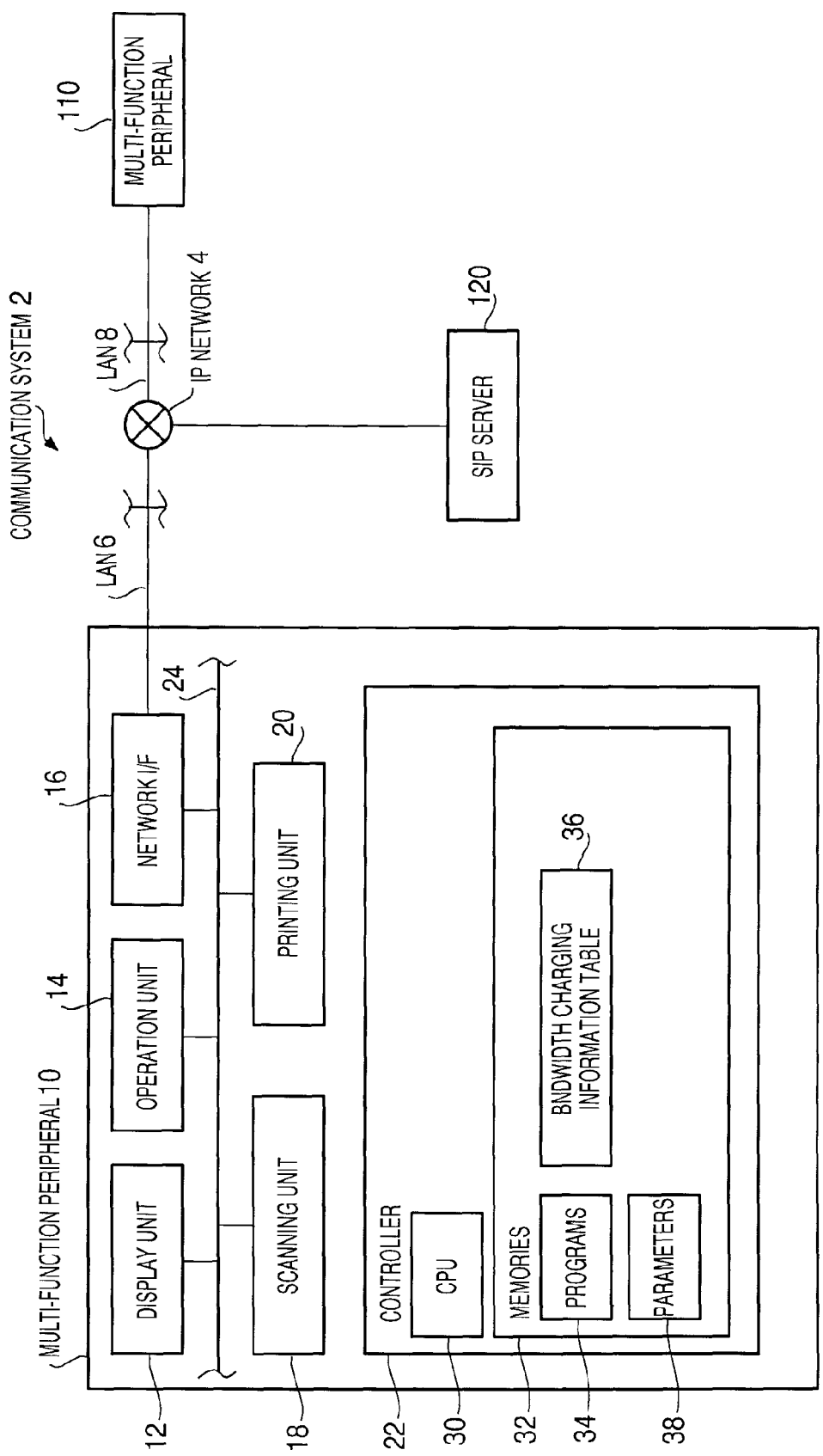

As shown in FIG. 1, a communication system 2 includes an IP network 4, LANs 6 and 8, multi-function peripherals 10 and 110, and a SIP server 120. The multi-function peripheral 10 is connected with the LAN 6. The multi-function peripheral 110 is connected with the LAN 8. The LANs 6 and 8 and the SIP server 120 are connected with the IP network 4. The multi-function peripherals 10 and 110 and the SIP server 120 are mutually communicable via the LANs 6 and 8 and the IP network 4.

The IP network 4 is provided by an Internet provider. The IP network 4 is controlled by the SIP server 120. Examples of the IP network 4 include an NGN (Next Generation Network). The NGN is a next generation network expected to replace the existing public network. Namely, the NGN is an integrated IP communication network that consolidates an IP network for the Internet service and a telephone network for the telephone service using an IP technology.

The NGN has a bandwidth guarantee function, which makes it possible to guarantee a contracted bandwidth (communication speed). A connection with the NGN can be established by selecting a bandwidth for each line connection. Further, the used bandwidth can be changed during the connection. Moreover, in the bandwidth-guaranteed data communication service, there are cases where a charging system (a time-based charging system) to charge a terminal device a communication fee depending on a time taken for data communication is applied. It is noted that the term "bandwidth guarantee" may be replaced with "QoS (Quality of Service)."

(Configuration of Multi-Function Peripheral)

A configuration of the multi-function peripheral 10 will be described. It is noted that the multi-function peripheral 110 has the same configuration as the multi-function peripheral 10. The multi-function peripheral 10 has a plurality of functions such as a printing function, a scanning function, a copying function, an e-mail communication function, an IPFAX function, and a telephone function. The multi-function peripheral 10 includes a display unit 12, an operation unit 14, a network interface (I/F) 16, a scanning unit 18, a printing unit 20, and a controller 22. These elements 12, 14, 16, 18, 20, and 22 are connected with a bus line 24. The display unit 12 is configured to display various kinds of information. The operation unit 14 is provided with a plurality of keys. A user is allowed to input various instructions into the multi-function peripheral 10 by operating the operation unit 14. The network I/F 16 is connected with the LAN 6. The scanning unit 18 is provided with a scanning mechanism such as a CIS or a CCD and configured to create image data by scanning an object to be scanned. The printing unit 20 is provided with a printing mechanism such as an inkjet-head printing mechanism or a laser printing mechanism and configured to perform printing in accordance with instructions from the controller 22.

The controller 22 includes a CPU 30 and one or more memories 32. The one or more memories 32 store programs 34, a bandwidth charging information table 36, and parameters 38. The CPU 30 is configured to execute processes in accordance with the programs 34 stored on the one or more memories 32.

FIG. 10 exemplifies the bandwidth charging information table 36. The bandwidth charging information table 36 stores various items of data such as bandwidths 60 (e.g., "2.6 Mbps-"), transmission speeds 61 (e.g., "5.0 MB/second"), charging times 62 (e.g., "180 second"), and charges 63 (e.g., "105 Yen"). The bandwidths 60 denote bandwidths in which the multi-function peripheral 10 is allowed to perform communication. In the example shown in FIG. 10, the bandwidths 60 includes five bandwidths "2.6 Mbps-," "1 Mbps-2.6 Mbps," "512 kbps-1 Mbps," "64 kbps-512 kbps," and "0 kbps-64 kbps." The multi-function peripheral 10 performs fax data communication in accordance with one of the five bandwidths 60. The five bandwidths 60 have respective different amounts of data transmittable for each unit time (one second). For example, the bandwidth "256 kbps (kilobit per second)" denotes that it is possible to transmit data at a rate of 256 kb (kilobit) per second. A larger amount of transmittable data per second denotes a higher communication speed. Further, a bandwidth with a higher communication speed is a higher level of bandwidth. Therefore, the bandwidth 60 of "2.6 Mbps-" is the highest level of bandwidth. The bandwidth 60 of "0 kbps-64 kbps" is the lowest level of bandwidth.

The charging times 62 are predetermined times of which communication is charged in a time-based charging system. In the time-based charging system, each time a charging time 62 (e.g., 180 seconds) has elapsed, another charging time 62 of communication is additionally charged. Each of the charges 63 is a communication fee per a corresponding charging time 62 that is required for communication in accordance with a corresponding bandwidths 60. As shown in the bandwidth charging information table 36, the broader the bandwidth 60 is (i.e., the higher the communication speed is), the higher the charge 63 is. Referring to the bandwidth charging information table 36, for instance, when the multi-function peripheral 10 performs communication in accordance with the bandwidth 60 of "2.6 Mbps-," a communication fee of 105 Yen is required for each communication of 180 seconds. It is noted that the bandwidth charging information table 36 may be previously stored on the memory 32 before shipment of the multi-function peripheral 10 by a vendor of the multi-function peripheral 10.

The parameters 38 include data for calculating a communication fee required for the multi-function peripheral 10 to perform fax data communication in accordance with each bandwidth. Specifically, the parameters 38 include a setup bandwidth 71, a check bandwidth 72, a required transmission time 75, a remaining transmission data amount 76, and a predetermined time 77. The setup bandwidth 71 is a bandwidth 60 adopted for transmission of partial fax data. The check bandwidth 72 is a bandwidth 60 adopted as a target bandwidth to be treated in a below-mentioned bandwidth determining process. The required transmission time 75 is a time required for completely transmitting fax data of the remaining transmission data amount 76 in accordance with the bandwidth 60 for fax data transmission. The remaining transmission data amount 76 is an amount of an unsent part of the fax data. The predetermined time 77 is a previously-determined time used for calculating a below-mentioned measurement unit time. It is noted that the parameters 38 may be previously stored on the memory before shipment of the multi-function peripheral 10 by the vendor of the multi-function peripheral 10.

(Configuration of SIP Server)

A configuration of the SIP server 120 will be described. The SIP server 120 stores, for each of the multi-function peripherals 10 and 110, the IP address and the SIPRI of the multi-function peripheral to be associated with each other. The SIP server 120 is configured to establish a communication session between the multi-function peripherals 10 and 110 using a SIP (Session Initiation Protocol). Namely, for instance, various commands, for establishing a communication session to perform an IPFAX transmission process between the multi-function peripherals 10 and 110, are transmitted via the SIP server 120.

(IPFAX Transmission Process)

Subsequently, referring to FIG. 2, an IPFAX transmission process will be described in an exemplary case where the multi-function peripheral 10 sends fax data to the multi-function peripheral 110.

Figure 2:
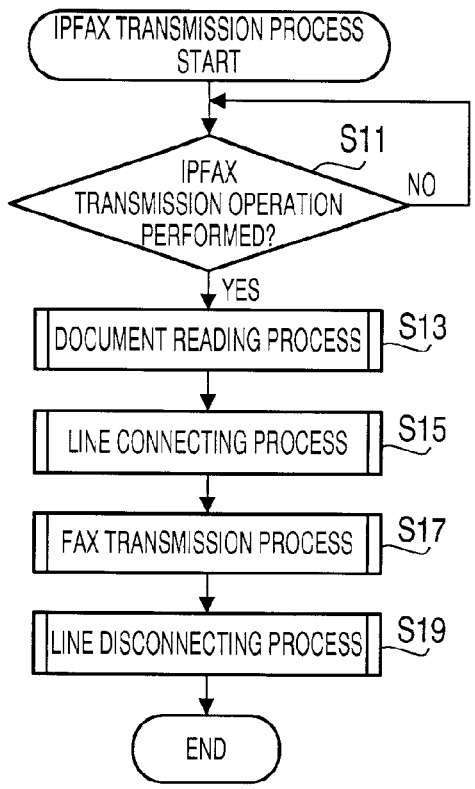
FIG. 2 is a flowchart showing a procedure of an IPFAX transmission process in the embodiment according to one or more aspects of the present invention.

FIG. 2 is a flowchart showing a procedure of a process to be executed while the multi-function peripheral 10 is powered up. The controller 22 monitors whether an IPFAX transmission operation is performed (S11). The user of the multi-function peripheral 10 is allowed to set a document sheet on an automatic document feeder (not shown) and perform the IPFAX transmission operation using the operation unit 14 in the situation where the document sheet is set on the automatic document feeder. The IPFAX transmission operation includes an operation of inputting the SIPURI of the multi-function peripheral 110 that is a destination of the fax data. When determining that the IPFAX transmission operation is performed (S11: Yes), the controller 22 goes to S13.

In S13, the controller 22 performs a document reading process. In S15, the controller 22 performs a line connecting process. In S17, the controller 22 performs a fax transmission process. In S19, the controller 22 performs a line disconnecting process. Thereby, the IPFAX transmission process is completed. In the following descriptions, the processes of S13 to S19 will be described.

(Document Reading Process)

Figure 3:
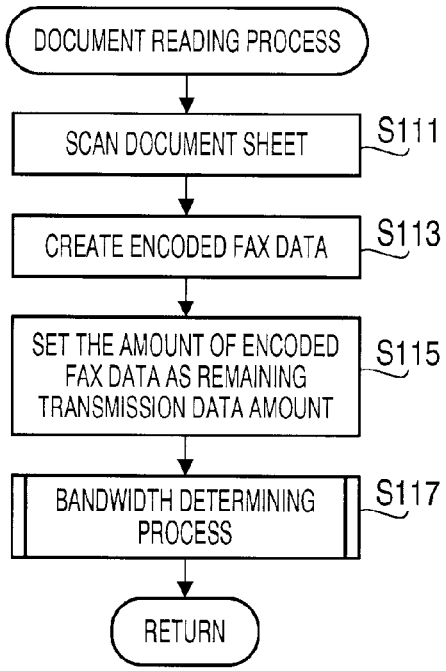
FIG. 3 is a flowchart showing a procedure of a document reading process in the embodiment according to one or more aspects of the present invention.

The document reading process (S13) will be described with reference to FIG. 3. In S111, the controller 22 controls the scanning unit 18 to scan the document sheet set on the automatic document feeder. Thereby, the scanning unit 18 creates scanned data. The controller 22 stores the scanned data onto the one or more memories 32. In S113, the controller 22 acquires the scanned data stored on the memories 32, performs an encoding process (a compressing process) of encoding the scanned data to create fax data, and stores the fax data onto the memories 32. As exemplary methods to encode the scanned data to create the fax data, there are cited a JBIG method, an MMR method, an MR method, and an MH method, when the created fax data is monochrome data. Further, in the case where the created fax data is color data, a JPEG compression method is cited as an exemplary encoding method.

In S115, the controller 22 stores, as the remaining transmission data amount 76, the data amount of the fax data encoded in S113. In S117, the controller 22 performs a bandwidth determining process.

(Bandwidth Determining Process)

The bandwidth determining process will be described with reference to FIG. 5. In S411, the controller 22 determines whether the setup bandwidth 71 has already been set. When determining that the setup bandwidth 71 has not been set (S411: No), the controller 22 goes to S413. In S413, the controller 22 sets, as the setup bandwidth 71 and the check bandwidth 72, the bandwidth 60 (2.6 Mbps-) that has the highest transmission speed 61 on the bandwidth charging information table 36. Meanwhile, when determining that the setup bandwidth 71 has already been set (S411: Yes), the controller 22 goes to S415. In S415, the controller 22 adopts, as the check bandwidth 72, a bandwidth 60 set as the setup bandwidth 71. Specifically, the controller 22 reads out a bandwidth 60 set as the setup bandwidth 71 from the parameters 38, and stores the read bandwidth 60 as the check bandwidth 72.

In S417, the controller 22 acquires, from the bandwidth charging information table 36, a transmission speed 61 corresponding to the bandwidth 60 set as the check bandwidth 72. In S419, the controller 22 calculates the required transmission time 75. Specifically, the controller 22 divides the remaining transmission data amount 76 by the acquired transmission speed 61 to obtain the required transmission time 75.

In S421, the controller 22 acquires, from the bandwidth charging information table 36, a charging time 62 corresponding to the bandwidth 60 set as the check bandwidth 72. In S423, the controller 22 determines whether the required transmission time 75 obtained in S419 is equal to or shorter than the acquired charging time 62. Namely, the controller 22 determines whether the remaining transmission data amount 76 is equal to or less than a data amount transmittable during a single period of the charging time in accordance with the bandwidth 60 set as the check bandwidth 72. When determining that the required transmission time 75 is longer than the charging time 62 (S423: No), the controller 22 goes to S441. In S441, the controller 22 determines whether the bandwidth 60 set as the check bandwidth 72 is identical to the bandwidth 60 set as the setup bandwidth 71. When determining that the bandwidth 60 set as the check bandwidth 72 is not identical to the bandwidth 60 set as the setup bandwidth 71 (S441: No), the controller 22 goes to S443. In S443, the controller 22 newly sets, as the setup bandwidth 71, a bandwidth 60 of a level higher by one than the bandwidth 60 currently set as the check bandwidth 72. Meanwhile, when determining that the bandwidth 60 set as the check bandwidth 72 is identical to the bandwidth 60 set as the setup bandwidth 71 (S441: Yes), the controller 22 goes to S445. In S445, the controller 22 maintains the bandwidth 60 set as the setup bandwidth 71 as it is. Then, the controller 22 terminates the bandwidth determining process.

Further, in S423, when determining that the required transmission time 75 is equal to or shorter than the charging time 62 (S423: Yes), the controller 22 determines that the target data to be transmitted is terminal fax data, and goes to S425. The terminal fax data is partial data of the fax data to be transmitted in the last one of a plurality of successive charging times 62 required for completely sending the fax data. In S425, the controller 22 determines whether there is a bandwidth 60 of a lower level than the bandwidth 60 set as the check bandwidth 72. When determining that there is a bandwidth 60 of a lower level than the bandwidth 60 set as the check bandwidth 72 (S425: Yes), the controller 22 goes to S427. In S427, the controller 22 changes the check bandwidth 72 to a bandwidth 60 of a level lower by one than the bandwidth 60 currently set as the check bandwidth 72. Then, the controller 22 goes back to S417. Meanwhile, when determining that there is not a bandwidth 60 of a lower level than the bandwidth 60 set as the check bandwidth 72 (S425: Yes), the controller 22 goes to S429. In S429, the controller 22 newly sets, as the setup bandwidth 71, the bandwidth 60 set as the check bandwidth 72. Then, the controller 22 terminates the bandwidth determining process.

(Line Connection Process)

Figure 4:
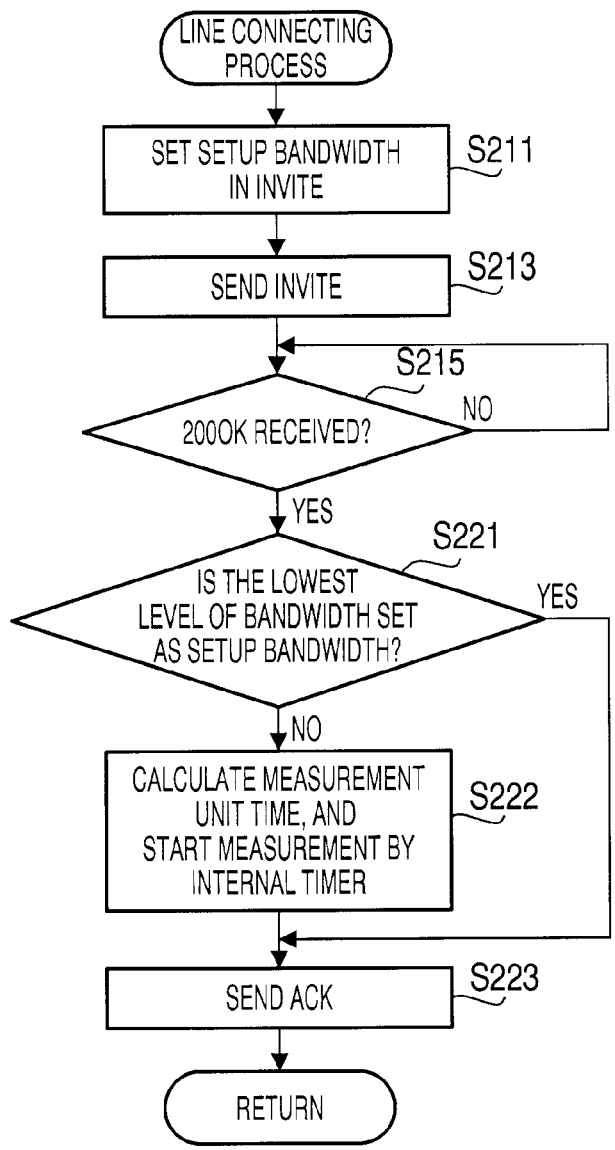
FIG. 4 is a flowchart showing a procedure of a line connecting process in the embodiment according to one or more aspects of the present invention.

The line connecting process (S15) will be described with reference to FIG. 4. In S211, the controller 22 sets the setup bandwidth 71 in an INVITE message. Specifically, the controller 22 writes a bandwidth to be used in an SDP (Session Description Protocol) using the unit "kbps" to demand the bandwidth. The SDP is a protocol for indicating the kind of a medium (e.g., sounds or images), a protocol used for conveying the medium, and a port number to be used. FIG. 13 exemplifies the SDP of the INVITE. As shown in an area A1, by writing the bandwidth 60 to be used as "b=AS: 512," it is possible to demand the bandwidth 60 of "64 kbps-512 kbps."

In S213, the controller 30 sends the INVITE to the SIP server 120 with the SIPRI acquired in S11 (see FIG. 2) as the destination. The SIP server 120 transfers the INVITE to the multi-function peripheral 110. In response to receipt of the INVITE, the multi-function peripheral 110 sends a 200OK response. The SIP server 120 transfers the 200OK to the multi-function peripheral 10.

In S215, after sending the INVITE, the controller 22 monitors whether the controller 22 has received the 200OK from the multi-function peripheral 110 via the SIP server 120. When determining that the controller 22 has not received the 200OK from the multi-function peripheral 110 via the SIP server 120 (S215: No), the controller 22 goes back to S215. Meanwhile, when determining that the controller 22 has received the 200OK from the multi-function peripheral 110 via the SIP server 120 (S215: Yes), the controller 22 goes to S221. In S221, the controller 22 determines whether the lowest level of bandwidth 60 (0 kbps-64 kbps) is set as the setup bandwidth 71. When determining that the lowest level of bandwidth 60 (0 kbps-64 kbps) is set as the setup bandwidth 71 (S221: Yes), the controller 22 goes to S223. Meanwhile, when determining that the lowest level of bandwidth 60 (0 kbps-64 kbps) is not set as the setup bandwidth 71 (S221: No), the controller 22 goes to S222.

In S222, the controller 22 calculates a measurement unit time. The measurement unit time is a time resulting from subtracting the predetermined time 77 from a charging time 62 corresponding to the bandwidth 60 adopted as the setup bandwidth 71. Further, the controller 22 starts time measurement using an internal timer, which is for detecting whether the measurement unit time has elapsed.

In S223, the controller 22 sends an ACK to the SIP server 120 with the SIPURI acquired in S11 (see FIG. 11) as the destination. The SIP server 120 transfers the ACK to the multi-function peripheral 110. The multi-function peripheral 110 receives the ACK. Thereby, a communication session is established between the multi-function peripherals 10 and 110. When the communication session is established, charging (a charging process) is started. In the embodiment, the SIP server 120 functions as a charging server. Specifically, when the communication session is established, the SIP server 120 begins to measure a communication time.

(FAX Transmission Process)

The fax transmission process (S17) will be described with reference to FIG. 6. The fax transmission process is a process to transmit the fax data to the multi-function peripheral 110 via the IP network 4. In S311, the controller 22 determines whether the controller 22 has received a DIS signal from the multi-function peripheral 110. The DIS signal is a first message that describes functions (such as an acceptable maximum sheet size, color/monochrome, an encoding method, a resolution, and existence/non-existence of T38) of the response-side apparatus (i.e., the multi-function peripheral 110). When determining that the controller 22 has not received a DIS signal from the multi-function peripheral 110 (S311: No), the controller 22 goes back to S311. Meanwhile, when determining that the controller 22 has received a DIS signal from the multi-function peripheral 110 (S311: Yes), the controller 22 goes to S313.

In S313, the controller 22 sends a DCS signal to the multi-function peripheral 110. The DCS signal defines transmission parameters and informs of a data format of data to be actually sent. In S315, the controller 22 determines whether the controller 22 has received a CFR signal from the multi-function peripheral 110. The CFR signal informs of receipt of the DCS signal. When determining that the controller 22 has not received a CFR signal from the multi-function peripheral 110 (S315: No), the controller 22 goes back to S315. Meanwhile, when determining that the controller 22 has received a CFR signal from the multi-function peripheral 110 (S315: Yes), the controller 22 goes to S317.

In S317, the controller 22 transmits partial fax data to the multi-function peripheral 110. The partial fax data is data of a single one of blocks into which the fax data is divided.

Figure 7:
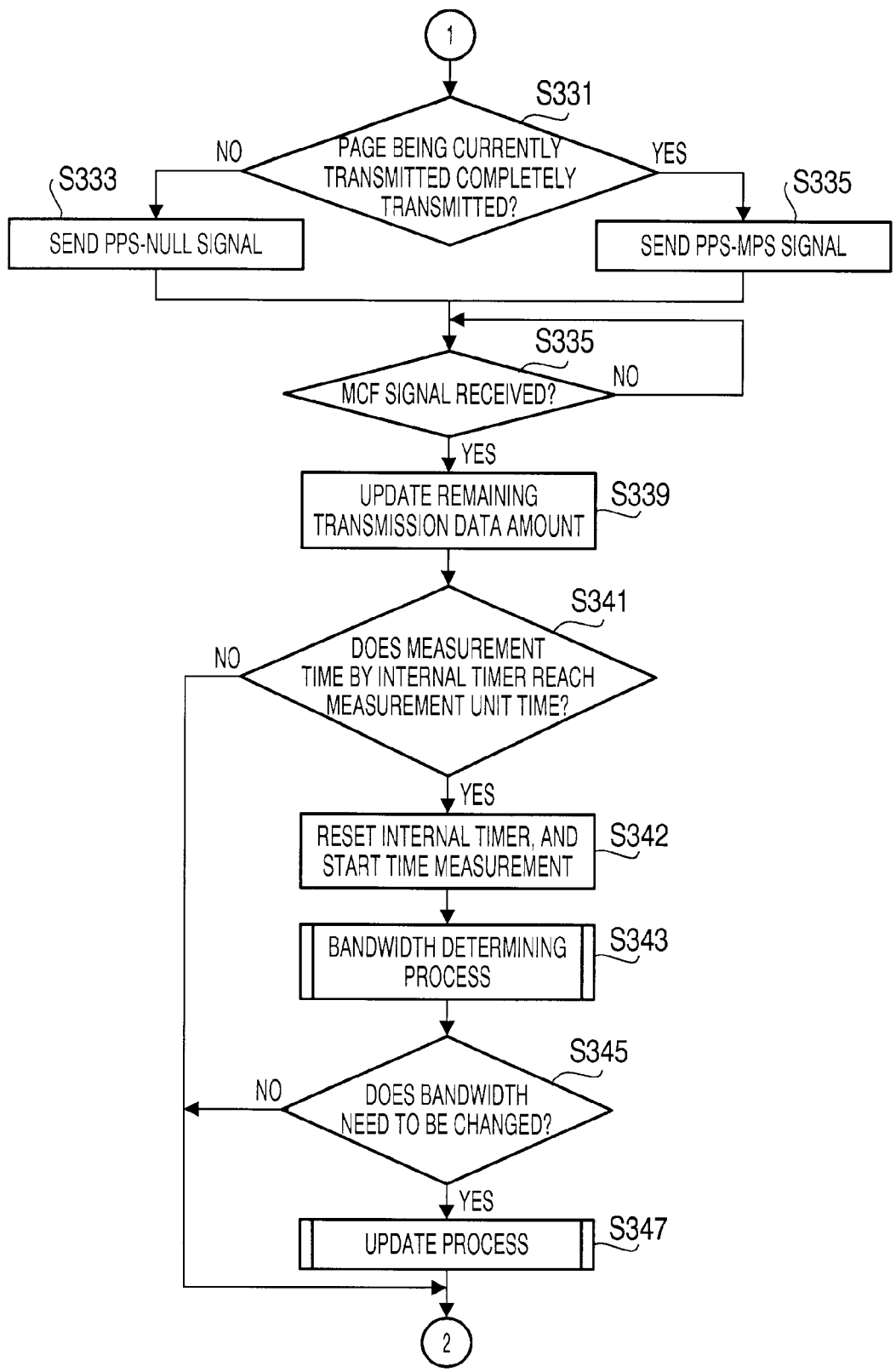

In S319, the controller 22 determines whether there is unsent fax data. When determining that there is unsent fax data (S319: Yes), the controller 22 goes to S331 (see FIG. 7). In S331, the controller 22 determines whether the page being currently transmitted has been completely transmitted. When determining that the page being currently transmitted has not been completely transmitted (S331: No), the controller 22 goes to S333. In S333, the controller 22 sends PPS (Partial Page Signal)-NULL signal to the multi-function peripheral 110. Meanwhile, when determining that the page being currently transmitted has been completely transmitted (S331: Yes), the controller 22 goes to S335. In S335, the controller 22 sends PPS-MPS (Multi Page Signal) signal to the multi-function peripheral 110.

In S337, the controller 22 determines whether the controller 22 has received an MCF signal from the multi-function peripheral 110. The MCF signal informs of receipt of partial fax data. When determining that the controller 22 has not received an MCF signal from the multi-function peripheral 110 (S337: No), the controller 22 goes back to S337. Meanwhile, when determining that the controller 22 has received an MCF signal from the multi-function peripheral 110 (S337: Yes), the controller 22 goes to S339.

In S339, the controller 30 updates the remaining transmission data amount 76. Specifically, the controller 30 subtracts, from the remaining transmission data amount 76 included in the parameters 38, the data amount of the partial fax data transmitted in S317.

In S341, the controller 22 determines whether the measurement time by the internal timer has reached the measurement unit time. When determining that the measurement time by the internal timer has not reached the measurement unit time (S341: No), the controller 22 goes back to S317 (see FIG. 6). Then, the controller 22 performs a process to transmit a subsequent block of partial fax data. Meanwhile, when determining that the measurement time by the internal timer has reached the measurement unit time (S341: Yes), the controller 22 goes to S342. In S342, the controller 22 resets the internal timer and again begins time measurement to monitor whether the measurement unit time has elapsed.

In S343, the controller 22 performs the bandwidth determining process. The detailed explanation about the bandwidth determining process has already been provided with reference to FIG. 5. Therefore, the detailed explanation about the bandwidth determining process will be omitted here.

In S345, the controller 22 determines whether the bandwidth 60 needs to be changed. Specifically, the controller determines whether the setup bandwidth 71 has been changed in the bandwidth determining process in S343. When determining that the bandwidth 60 does not need to be changed (S345: No), the controller 22 goes back to S317, in which the controller 22 performs a process to transmit a subsequent block of partial fax data. Meanwhile, when determining that the bandwidth 60 needs to be changed (S345: Yes), the controller 22 goes to S347, in which the controller 22 performs an UPDATE process.

(UPDATE Process)

Figure 8:
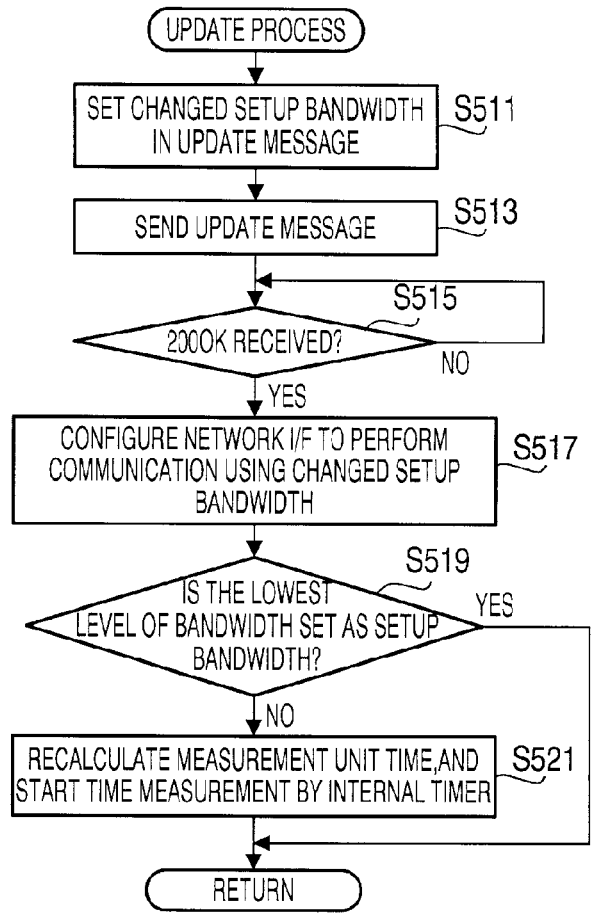
FIG. 8 is a flowchart showing a procedure of an UPDATE process in the embodiment according to one or more aspects of the present invention.

The UPDATE process to be executed in S347 will be described with reference to FIG. 8. In S511, the controller 22 sets the changed setup bandwidth 71 in an UPDATE message. The UPDATE message is information for changing various kinds of communication settings. Further, the UPDATE message is configured to be output in parallel with the fax data. It is noted that a method to set the setup bandwidth 71 in the UPDATE message is substantially the same as the method to set the setup bandwidth 71 in the INVITE message. Therefore, a detailed explanation about the method to set the setup bandwidth 71 in the UPDATE message will be omitted here.

In S513, the controller 22 sends the UPDATE to the SIP server 120. The SIP server 120 transfers the UPDATE to the multi-function peripheral 110. In response to receipt of the INVITE, the multi-function peripheral 110 sends a 200OK response. The SIP server 120 transfers the 200OK to the multi-function peripheral 10.

In S515, the controller 22 monitors whether the controller 22 has received the 200OK from the SIP server 120. When determining that the controller 22 has not received the 200OK (S515: No), the controller 22 goes back to S515. Meanwhile, when determining that the controller 22 has received the 200OK (S515: Yes), the controller 22 goes to S517. In S517, the controller 22 configures the network I/F 16 to perform communication using a bandwidth 60 adopted as the changed setup bandwidth 71.

In S519, the controller 22 determines whether the lowest level of bandwidth 60 (0 kbps-64 kbps) is adopted as the setup bandwidth 71. When determining that the lowest level of bandwidth 60 is adopted as the setup bandwidth 71 (S519: Yes), the controller 22 terminates the UPDATE process. Meanwhile, when determining that the lowest level of bandwidth 60 is not adopted as the setup bandwidth 71 (S519: No), the controller 22 goes to S521. In S521, the controller 22 lunches the internal timer. At this time, the controller 22 controls the internal timer to recalculate the measurement unit time corresponding to the bandwidth 60 adopted as the changed setup bandwidth 71. Then, the controller 22 controls the internal timer to measure elapsed time so as to detect whether the recalculated measurement unit time has elapsed. Thereafter, the controller 22 terminates the UPDATE process.

Meanwhile, in S319 (see FIG. 6), when determining that there is not unsent fax data (S319: No), the controller 22 goes to S351, in which the controller 22 sends a PPS-EOS signal to the multi-function peripheral 110. The PPS-EOP signal is a message that informs of termination of the fax transmission. In S353, the controller 22 determines whether there is an MCF signal received from the multi-function peripheral 110. The MCF signal is a response signal that the multi-function peripheral 110 issues in a sequence of messages exchanged for termination of the fax transmission. When determining that there is not an MCF signal received from the multi-function peripheral 110 (S353: No), the controller 22 goes back to S353. When determining that there is an MCF signal received from the multi-function peripheral 110 (S353: Yes), the controller 22 goes to S355.

In S355, the controller 22 sends a DCN signal to the multi-function peripheral 110. The DCN signal is a signal that informs of disconnection between the multi-function peripherals 10 and 110. Then, the controller 22 terminates the fax transmission process.

(Line Disconnecting Process)

Figure 9:
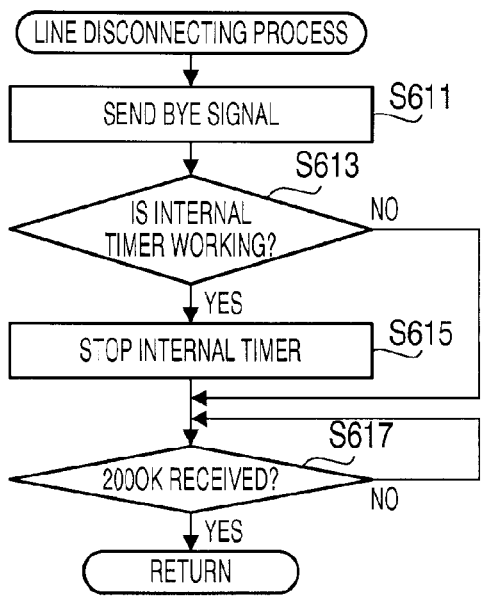
FIG. 9 is a flowchart showing a procedure of a line disconnecting process in the embodiment according to one or more aspects of the present invention.

The line disconnecting process (S19) will be described with reference to FIG. 9. In S611, the controller 22 sends a BYE signal to the SIP server 120. The BYE signal is a command for terminating the communication session between the multi-function peripherals 10 and 110. In S613, the controller 22 determines whether the internal timer is working. When determining that the internal timer is not working (S613: No), the controller 22 goes to S617. When determining that the internal timer is working (S613: Yes), the controller 22 goes to S615. In S615, the controller 22 stops the internal timer.

When receiving the BYE, the SIP server 120 terminates the charging process, and transfers the BYE to the multi-function peripheral 110. When terminating the charging process, the SIP server 120 stops the measurement of the communication time taken for the communication between the multi-function peripherals 10 and 110. When receiving the BYE, the multi-function peripheral 110 sends a 200OK to the SIP server 120. The SIP server 120 transfers the 200OK to the multi-function peripheral 10. In S617, the controller 22 monitors whether the controller 22 has received the 200OK from the SIP server 120. When determining that the controller 22 has not received the 200OK from the SIP server 120 (S617: No), the controller 22 goes back to S617. When determining that the controller 22 has received the 200OK from the SIP server 120 (S617: Yes), the communication session between the multi-function peripherals 10 and 110 ends. Thereby, controller 22 completes the IPFAX transmission process.

(Specific Examples of Operations)

Referring to FIG. 12, an explanation will be provided about specific examples of operations of the communication system 2 in the embodiment. The following description will be provided under an assumption that the data amount of the fax data is 1805 (MB), the bandwidth 60 is "2.6 Mbps-," the transmission speed 61 is 5.0 (MB/s) (which is the maximum transmission ability of the multi-function peripheral 10), and the parameters 38 include the predetermined time 77 equal to "1 (s)."

When determining that the IPFAX transmission operation is performed (S11: No), the multi-function peripheral 10 (the controller 22) performs the document reading process (see FIG. 3). As an initial value of the remaining transmission data amount 76, the multi-function peripheral 10 sets 1805 (MB) (S15). Further, the multi-function peripheral 10 performs the bandwidth determining process (see FIG. 5). Since the setup bandwidth 71 has not been set (S411: No), the multi-function peripheral 10 sets the bandwidth 60 of "2.6 Mbps-" as the setup bandwidth 71 and the check bandwidth 72 (S413). The multi-function peripheral 10 acquires the transmission speed 61 equal to "5.0 MB/s" for the check bandwidth (S417), and calculates the required transmission time 75 to be equal to "361 (s)" (S419). Further, the multi-function peripheral 10 acquires the charging time 62 equal to "180 (s)" for the check bandwidth 72 (S421). Thus, since the required transmission time 75 (361 (s)) is not equal to or shorter than the charging time 62 (180 (s)) (S423: No) and the check bandwidth 72 is identical to the setup bandwidth 71 (S441: Yes), the multi-function peripheral 10 maintains the bandwidth 60 set as the setup bandwidth 71 as it is (S445).

Subsequently, the multi-function peripheral 10 starts the line connecting process (see FIG. 4). The setup bandwidth 71 of "2.6 Mbps-" is set in the INVITE message (S211), and the INVITE is transmitted to the SIP server 120 (S213). When the multi-function peripheral 10 receives the 200OK from the multi-function peripheral 110 via the SIP server 120 (S215: Yes), the lowest level of bandwidth 60 (0 kbps-64 kbps) is not set as the setup bandwidth 71 (S221: No), and therefore the multi-function peripheral 10 starts measuring the measurement unit time by the internal timer (S222). At this time, the measurement unit time is determined to be a value (179 (s)), which is obtained by subtracting the predetermined time 77 (1 (s)) from the charging time 62 (180 (s)). Then, the multi-function peripheral 10 sends the ACK to the SIP server 120 to establish the communication session between the multi-function peripherals 10 and 110 (S223).

Subsequently, the multi-function peripheral 10 starts the fax transmission process (see FIG. 6). In the fax transmission process, until the measurement time by the internal timer reaches the measurement unit time (179 (s)), the multi-function peripheral 10 repeatedly performs an operation of transmitting partial fax data to the multi-function peripheral 110 (S317) and an operation of updating the remaining transmission data amount 76 (S339). When the measurement time by the internal timer reaches the measurement unit time (179 (s)) (S341: Yes), the multi-function peripheral 10 completely transmits fax data D11 of 900 (MB) during a time period T1 indicated in FIG. 12. Further, as shown in FIG. 12, the remaining transmission data amount 76 (updated in S339) at the end of the time period T1 is 905 (MB). The charged fee during the time period T1 is 105 Yen. Then, the multi-function peripheral 10 performs the second round of the bandwidth determining process (S343).

The second round of the bandwidth determining process (see FIG. 5) will be described. Since the setup bandwidth 71 has already been set (S411: Yes), the multi-function peripheral 10 adopts the setup bandwidth 71 (2.6 Mbps-) as the check bandwidth 72 (S415). The multi-function peripheral 10 acquires the transmission speed 61 equal to "5.0 MB/s" for the check bandwidth 72 (S417), and calculates the required transmission time 75 to be equal to "181 (s)" (S419). Further, the multi-function peripheral 10 acquires the charging time 62 equal to "180 (s)" for the check bandwidth 72 (S421). Since the required transmission time 75 (181 (s)) is not equal to or shorter than the charging time 62 (180 (s)) (S423: No) and the check bandwidth 72 is identical to the setup bandwidth 71 (S441: Yes), the multi-function peripheral 10 maintains the bandwidth 60 of "2.6 Mbps-" set as the setup bandwidth 71 (S445).

Then, since the bandwidth 60 does not need to be changed (S345: No), the multi-function peripheral 10 again starts the fax transmission process (see FIG. 6). When the measurement time by the internal timer reaches the measurement unit time (179 (s)) (S341: Yes), the multi-function peripheral 10 completely transmits fax data D12 of 900 (MB) during a time period T2 indicated in FIG. 12. Further, as shown in FIG. 12, the remaining transmission data amount 76 (updated in S339) at the end of the time period T2 is 5 (MB). Furthermore, the charged fee during the time period T2 is 105 Yen. Then, the multi-function peripheral 10 performs the third round of the bandwidth determining process (S343).

The third round of the bandwidth determining process (see FIG. 5) will be described. Since the setup bandwidth 71 has already been set (S411: Yes), the multi-function peripheral 10 adopts the setup bandwidth 71 (2.6 Mbps-) as the check bandwidth 72 (S415). The multi-function peripheral 10 acquires the transmission speed 61 equal to "5.0 MB/s" for the check bandwidth 72 (S417), and calculates the required transmission time 75 to be equal to "1 (s)" (S419). Further, the multi-function peripheral 10 acquires the charging time 62 equal to "180 (s)" for the check bandwidth 72 (S421). Since the required transmission time 75 (1 (s)) is shorter than the charging time 62 (180 (s)) (S423: Yes), the multi-function peripheral 10 determines to transmit terminal fax data D13. As shown in FIG. 12, the terminal fax data D13 is data to be transmitted during the last one of a plurality of successive charging times 62. The data amount of the terminal fax data D13 is identical to the remaining transmission data amount 76 of 5 (MB) at the end of the time period T2. In addition, since there is a bandwidth 60 of a lower level than the bandwidth 60 set as the check bandwidth 72 (S425: Yes), the multi-function peripheral 10 changes the check bandwidth 72 to the bandwidth 60 (1 Mbps-2.6 Mbps) of the level lower by one than the bandwidth 60 currently set as the check bandwidth 72.

The multi-function peripheral 10 acquires the transmission speed 61 equal to "322 KB/s" for the changed check bandwidth 72 (S417), and calculates the required transmission time 75 to be equal to "15 (s)" (S419). Additionally, the multi-function peripheral 10 acquires the charging time 62 equal to "180 (s)" for the check bandwidth 72 (S421). Since the required transmission time 75 (15 (s)) is shorter than the charging time 62 (180 (s)) (S423: Yes) and there is a bandwidth 60 of a lower level than the bandwidth 60 set as the check bandwidth 72 (S425: Yes), the multi-function peripheral 10 changes the check bandwidth 72 to the bandwidth 60 (512 kbps-1 Mbps) of the level lower by one than the bandwidth 60 currently set as the check bandwidth 72.

The multi-function peripheral 10 acquires the transmission speed 61 equal to "128 KB/s" for the changed check bandwidth 72 (S417), and calculates the required transmission time 75 to be equal to "40 (s)" (S419). Specifically, the required transmission time 75 is obtained by dividing the remaining transmission data amount 76 (5 (MB), i.e., 5120 (KB)) by the acquired transmission speed 61 (128 (KB/s)). Further, the multi-function peripheral 10 acquires the charging time 62 equal to "30 (s)" for the check bandwidth 72 (S421). Since the required transmission time 75 (40 (s)) is not equal to or shorter than the charging time 62 (30 (s)) (S423: No) and the check bandwidth 72 is not identical to the setup bandwidth 71 (S441: No), the multi-function peripheral 10 newly sets, as the setup bandwidth 71, the bandwidth 60 (1 Mbps-2.6 Mbps) of the level higher by one than the bandwidth 60 currently set as the check bandwidth 72.

Then, since the bandwidth 60 needs to be changed (S345: Yes), the multi-function peripheral 10 starts the UPDATE process (see FIG. 8). The multi-function peripheral 10 sets the setup bandwidth 71 of "1 Mbps-2.6 Mbps" in the UPDATE message (S511), and sends the UPDATE message to the SIP server 120 (S513). When the multi-function peripheral 10 receives the 200OK from the multi-function peripheral 110 via the SIP server 120 (S515: Yes), the bandwidth 60 (0 kbps-64 kbps) of the lowest level is not set as the setup bandwidth 71 (S519: No), and therefore the multi-function peripheral 10 starts measuring the measurement unit time by the internal timer (S521). At this time, the measurement unit time is determined to be the value (179 (s)), which is obtained by subtracting the predetermined time 77 (1 (s)) from the charging time 62 (180 (s)).

Figure 6:
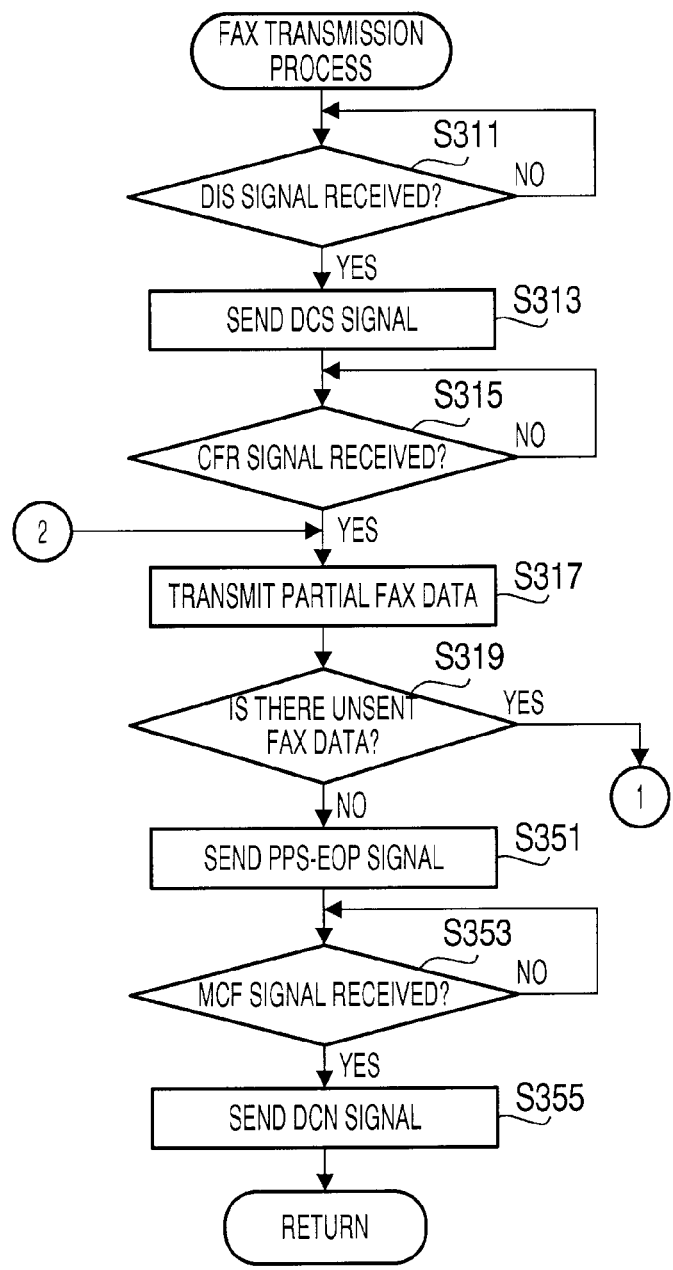
FIGS. 6 and 7 are flowcharts showing a procedure of a fax transmission process in the embodiment according to one or more aspects of the present invention.

Then, the multi-function peripheral 10 again starts the fax transmission process (see FIG. 6). When the multi-function peripheral 10 completes transmission of fax data of "5 (MB)," there is not unsent fax data (S319: No), and therefore the multi-function peripheral 10 terminates the fax transmission process (S351-S355). Thereby, the multi-function peripheral 10 completely transmits fax data D13 of 5 (MB) during a time period T3 indicated in FIG. 12. Thus, the multi-function peripheral 10 completes transmission of all the fax data. Further, the charged fee during the time period T3 is 15 Yen. The multi-function peripheral 10 performs the line disconnecting process (S611-S617 in FIG. 9) to terminate the communication session between the multi-function peripherals 10 and 110.

(Advantages)

Advantages that the multi-function peripheral 10 configured as above in the embodiment provides will be described. First, a comparative example will be described with reference to FIG. 11. FIG. 11 is an illustrative drawing that shows a communication fee to be charged in the case of the fixed bandwidth 60 of "2.6 Mbps-" and the fixed transmission speed 61 of "5.0 MB/s." The required transmission time 75 (361 (s)) for transmitting all the fax data of 1805 (MB) is longer than the charging time 62 (180 (s)). Therefore, the charging time 62 is to be updated one or more times. Further, the data amount (5 (MB)) of terminal fax data D23 to be transmitted within the last charging time 62 is smaller than the data amount (900 (MB)) transmittable within the charging time 62. In this case, the terminal fax data D23 is transmitted with the unnecessarily broad bandwidth 60. As described above, the broader the bandwidth 60 is, the higher the charge 63 is. Hence, the charge 63 for transmitting the terminal fax data D23 is higher than necessary. In the example shown in FIG. 11, a total communication fee of 315 yen is required for transmitting the fax data of 1805 (MB).

Meanwhile, according to the multi-function peripheral 10 of the embodiment, as shown in FIG. 12, it is possible to adopt, as a bandwidth for transmitting the terminal fax data D13, the bandwidth 60 (1 Mbps-2.6 Mbps) of a lower level than the bandwidth 60 (2.6 Mbps-) for transmitting the fax data D11 and D12. Therefore, it is possible to prevent the terminal fax data D13 from being transmitted using a bandwidth with an unnecessarily high communication speed. Further, since the charge 63 for each charging time 62 is rendered lower in response to a lower communication speed, it is possible to avoid an unnecessarily high communication fee to be charged for transmission of the terminal fax data D13. In the example shown in FIG. 12, a total communication fee of 225 yen is required for transmitting the fax data of 1805 (MB).

Further, according to the embodiment, each time the charging time 62 has elapsed (S341: Yes), the multi-function peripheral 10 acquires the data amount of the unsent fax data (the remaining transmission data amount 76) in real time (S339). Thereby, it is possible to calculate the data amount of the terminal fax data more exactly in comparison with a case where the data amount of the terminal fax data is calculated before the start of the communication.

Further, according to the embodiment, the multi-function peripheral 10 transmits a part of the fax data other than the terminal fax data at the maximum communication speed. Thereby, it is possible to reduce both the communication fee and the required transmission time 75 for completely transmitting the fax data.

In the IP network 4 (NGN), there may be measurement errors occurring in measurement of a charging unit time by the SIP server 120 for reasons such as a communication delay. According to the embodiment, the multi-function peripheral 10 more exactly calculates the communication fee by determining the predetermined time 77 in consideration of measurement errors.

Further, according to the embodiment, the multi-function peripheral 10 starts measuring the measurement unit time by the internal timer (S222) in response to receipt of the 200OK from the SIP server 120 (S215: Yes). Therefore, it is possible to more exactly specify the start point of the charging time 62.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are feasible.

(Modifications)

The moment to perform the bandwidth determining process is not limited to in the document reading process (S117). The bandwidth determining process may be performed at an arbitrary moment. For example, as shown in FIG. 14, the bandwidth determining process may be performed in the line connecting process. The flowchart shown in FIG. 14 includes additional steps S216a to S220a that are not in the flowchart shown in FIG. 4. In S215, when receiving the 200OK from the SIP server 120 (S215: Yes), the controller 22 goes to S216a. In S216a, the controller 22 acquires an encoding method with which the multi-function peripheral 110 (the communication destination device) complies. Specifically, the controller 22 reads out the encoding method from the DIS in the SDP of the 200OK received in S215. FIG. 15 exemplifies the SDP of the 200OK message. A character string for the DIS is written. By reading out, from the character string, a predetermined character string indicating the encoding method, the controller 22 acquires the encoding method with which the multi-function peripheral 110 complies. In S217a, the controller 22 determines whether the multi-function peripheral 110 complies with the encoding method used for creating the fax data in S113 (see FIG. 3). When determining that the multi-function peripheral 110 complies with the encoding method used for creating the fax data in S113 (S217: Yes), the controller 22 goes to S221. When determining that the multi-function peripheral 110 does not comply with the encoding method used for creating the fax data in S113 (S217: No), the controller 22 goes to S218a. In S218a, the controller 22 re-encodes (re-compresses) the stored fax data with the encoding method with which the multi-function peripheral 110 complies. Here, the fax data encoded in S113 and the fax data re-encoded in S218a may have respective different data amounts because of respective different encoding methods applied thereto. In S219a, the controller 22 stores, as the remaining transmission data amount 76, the data amount of the fax data re-encoded in S218a. In S220a, the controller 22 performs the bandwidth determining process. Thereby, it is possible to determine the remaining transmission data amount 76 based on the encoding method with which the multi-function peripheral 110 complies.

In the aforementioned embodiment, the multi-function peripheral 10 performs the fax transmission process to transmit the fax data to the multi-function peripheral 110. However, for instance, the controller 22 may send an e-mail using the bandwidth 60 selected in the bandwidth determining process (see FIG. 5).

Figure 5:
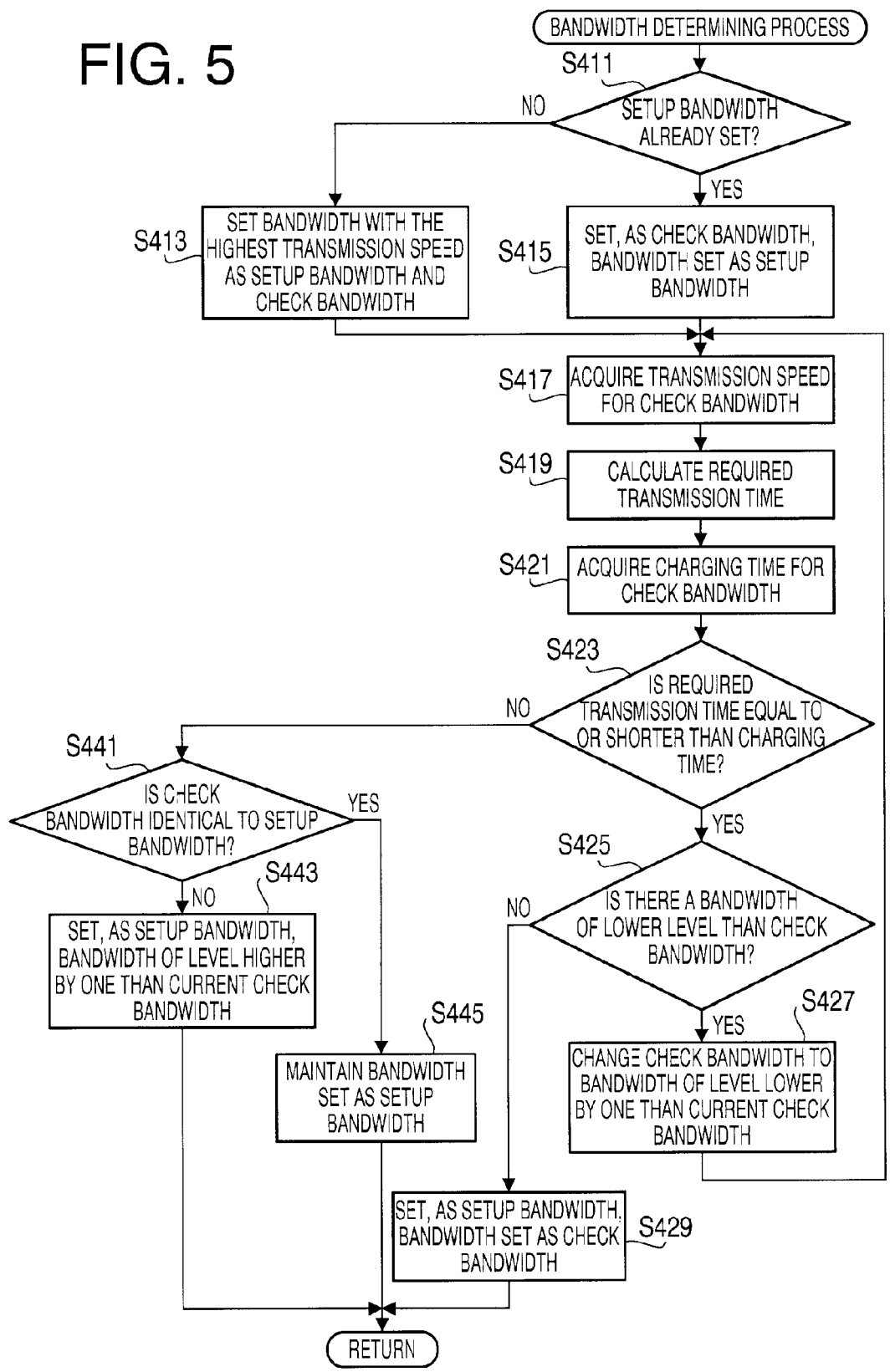
FIG. 5 is a flowchart showing a procedure of a bandwidth determining process in the embodiment according to one or more aspects of the present invention.

Further, the multi-function peripheral 10 may perform data communication to receive data (such as fax data and an e-mail) from the multi-function peripheral 110 using the bandwidth 60 selected in the bandwidth determining process (see FIG. 5).

Furthermore, the information (such as the number of the bandwidths 60, the bandwidths 60, and the transmission speeds 61) stored on the bandwidth charging information table 36 (see FIG. 10) is not limited to the information exemplified in the aforementioned embodiment.

What is claimed is:

1. A communication device comprising:
   a communication unit configured to be connected with a bandwidth-guaranteed
   network and transmit data using one of a plurality of bandwidths that provide respective different communication speeds and respective different communication fees per charging unit time; and
   a controller configured to control the communication device and provide:
   a first selecting unit configured to select a first bandwidth from the plurality of bandwidths;
   a time measuring unit configured to, while the communication unit is performing communication of the data using the first bandwidth, detect whether a measurement unit time based on the charging unit time has elapsed, the time measuring unit being reset each time detecting that the measurement unit time has elapsed;
   a first acquiring unit configured to, each time the time measuring unit detects that the measurement unit time has elapsed, acquire a remaining data amount that is a data amount of an unsent part of the data;
   a calculating unit configured to calculate the acquired remaining data amount as the data amount of the terminal data section in response to detecting that the remaining data amount is smaller than an amount of data transmittable within a single period of the charging unit time using the first bandwidth; and
   a second selecting unit configured to select, from the plurality of bandwidths, a second bandwidth that allows complete transmission of the terminal data section at a lowest communication fee within a second charging unit time for the second bandwidth, based on the calculated data amount of the terminal data section,
   wherein the controller controls the communication unit to transmit a data section of the data other than the terminal data section using the first bandwidth and transmit the terminal data section using the second bandwidth.

2. The communication device according to claim 1, wherein the first selecting unit is configured to select, as the first bandwidth, one of the plurality of bandwidths that provides a highest communication speed.

3. The communication device according to claim 1, wherein the time measuring unit is configured to utilize the measurement unit time determined by subtracting a predetermined time from the first charging unit time.

4. The communication device according to claim 1, wherein the time measuring unit is configured to begin to detect whether the measurement unit time has elapsed, in response to receiving from a party device a status code that indicates successful establishment of a communication session between the communication device and the party device.

5. The communication device according to claim 1, wherein the controller is configured to further provide a second acquiring unit configured to acquire an encoding method from a party device with which the communication device performs data communication, and
   wherein the communication unit is configured to transmit the data compressed based on the encoding method acquired by the second acquiring unit.

6. A method adapted to be implemented on a processor coupled with a communication unit configured to be connected with a bandwidth-guaranteed network and transmit data using one of a plurality of bandwidths that provide respective different communication speeds and respective different communication fees per charging unit time, the method comprising:

a first selecting step of selecting a first bandwidth from the plurality of bandwidths;

a time measuring step of, while the communication unit is performing communication of the data using the first bandwidth, measuring time to detect whether a measurement unit time based on the first charging unit time has elapsed, the measured time being reset each time detecting that the measurement unit time has elapsed;

a first acquiring step of, each time it is detected that the measurement unit time has elapsed, acquiring a remaining data amount that is a data amount of an unsent part of the data;

a calculating step of calculating the acquired remaining data amount as the data amount of the terminal data section in response to detecting that the remaining data amount is smaller than an amount of data transmittable within a single period of the first charging unit time using the first bandwidth;

a second selecting step of selecting, from the plurality of bandwidths, a second bandwidth that allows complete transmission of the terminal data section at a lowest communication fee within a second charging unit time for the second bandwidth, based on the calculated data amount of the terminal data section; and a transmission control step of controlling the communication unit to transmit a data section of the data other than the terminal data section using the first bandwidth and transmit the terminal data section using the second bandwidth.

7. The method according to claim 6, wherein the first selecting step includes selecting, as the first bandwidth, one of the plurality of bandwidths that provides a highest communication speed.

8. The method according to claim 6, wherein the time measuring step includes utilizing the measurement unit time determined by subtracting a predetermined time from the first charging unit time.

9. The method according to claim 6, wherein the time measuring step includes beginning to detect whether the measurement unit time has elapsed, in response to receiving from a party device a status code that indicates successful establishment of a communication session between the communication unit and the party device.

10. The method according to claim 6, further comprising a second acquiring step of acquiring an encoding method from a party device with which the communication unit performs data communication, and wherein the communication unit is configured to transmit the data compressed based on the encoding method acquired in the second acquiring step.

11. A non-transitory computer readable medium storing instructions that, when executed by a processor coupled with a communication unit configured to be connected with a bandwidth-guaranteed network and transmit data using one of a plurality of bandwidths that provide respective different communication speeds and respective different communication fees per charging unit time, cause the processor to perform:

a first selecting step of selecting a first bandwidth from the plurality of bandwidths;

a time measuring step of, while the communication unit is performing communication of the data using the first bandwidth, measuring time to detect whether a measurement unit time based on the first charging unit time has elapsed, the measured time being reset each time detecting that the measurement unit time has elapsed;

a first acquiring step of, each time it is detected that the measurement unit time has elapsed, acquiring a remaining data amount that is a data amount of an unsent part of the data;

a calculating step of calculating the acquired remaining data amount as the data amount of the terminal data section in response to detecting that the remaining data amount is smaller than an amount of data transmittable within a single period of the first charging unit time using the first bandwidth;

a second calculating step of:
  summing one or more periods of a first charging unit time for the first bandwidth to calculate a second communication time of a length that is equal to or longer than the first communication time and closest to the first communication time; and
  calculating a data amount of a terminal data section to be transmitted within a last period of the first charging unit time included in the second communication time;

a second selecting step of selecting, from the plurality of bandwidths, a second bandwidth that allows complete transmission of the terminal data section at a lowest communication fee within a second charging unit time for the second bandwidth, based on the calculated data amount of the terminal data section; and a transmission control step of controlling the communication unit to transmit a data section of the data other than the terminal data section using the first bandwidth and transmit the terminal data section using the second bandwidth.

12. The computer readable medium according to claim 11, wherein the first selecting step includes selecting, as the first bandwidth, one of the plurality of bandwidths that provides a highest communication speed.

13. The computer readable medium according to claim 11, wherein the time measuring step includes utilizing the measurement unit time determined by subtracting a predetermined time from the first charging unit time.

14. The computer readable medium according to claim 11, wherein the time measuring step includes beginning to detect whether the measurement unit time has elapsed, in response to receiving from a party device a status code that indicates successful establishment of a communication session between the communication unit and the party device.

15. The computer readable medium according to claim 11, wherein, when executed by the processor, the instructions further cause the processor to perform a second acquiring step of acquiring an encoding method from a party device with which the communication unit performs data communication, and wherein the communication unit is configured to transmit the data compressed based on the encoding method acquired in the second acquiring step.

* * * * *